United States Patent Office 3,032,190
Patented May 1, 1962

3,032,190
BENEFICIATION OF PHOSPHATE ORES
Ira M. Le Baron, Evanston, Ill., assignor to International Minerals & Chemical Corporation, a corporation of New York
No Drawing. Filed Nov. 17, 1958, Ser. No. 774,130
7 Claims. (Cl. 209—12)

This invention relates to a method of beneficiating phosphatic ores. More particularly, this invention relates to a method of preparing a high grade phosphate rock concentrate from low grade phosphatic ores containing relatively large proportions of iron and aluminum impurities.

Numerous ore dressing techniques have been employed heretofore for the treatment of phosphatic ores to produce a phosphate rock concentrate suitable for the use in preparation of phosphoric acid, triple superphosphate, and other fertilizer materials. Specifications of the industry generally require a phosphate rock concentrate having a minimum proportion of bone phosphate of lime (BPL) of about 72% by weight and a maximum proportion of iron and aluminum of about 4% by weight, determined as ferric oxide and aluminum oxide. Phosphate rock concentrates containing large proportions of iron and aluminum impurities are undesirable for use in the preparation of phosphoric acid, since the iron and aluminum are solubilized when the rock is reacted with sulfuric acid and appear as soluble impurities in the resulting phosphoric acid. In addition, phosphate rock concentrates containing large proportions of iron and aluminum impurities are undesirable for use in the preparation of fertilizer materials such as triple superphosphate, since the iron and aluminum impurities are generally converted to phosphates in the process. Phosphates of iron and aluminum are not readily available to plants and therefore have little nutritional value.

Certain phosphatic ores such as are found in the Florida phosphate pebble field can be beneficiated economically by well known ore dressing techniques to produce a phosphate rock concentrate which meets the requirements of the industry with respect to the BPL content and the iron and aluminum content. However, certain other phosphatic ores, such as those found in Tennessee and the Senegal district of French West Africa, contain relatively large proportions of iron and aluminum and cannot be concentrated economically by conventional ore dressing techniques to produce a concentrate which meets the requirements of the industry.

It is an object of the present invention to provide a method of beneficiating phosphatic ores.

Another object of this invention is to provide a method of preparing a phosphate rock concentrate containing relatively small proportions of silica, iron and aluminum impurities from low-grade phosphate ore.

Still another object of this invention is to provide a method of beneficiating Tennessee white phosphate ore.

It is another object of this invention to provide a method of beneficiating African phosphate ore.

Still another object of this invention is to provide a method of beneficiating Tennessee brown phosphate ore.

These and other objects of the invention will become apparent from the following detailed description of the invention.

It has now been discovered that when a phosphatic ore containing compounds of iron and aluminum disproportionately associated with the various phosphatic components of the ore is subjected to electrostatic beneficiation to separate a major portion of silica, and the resulting concentrate, which, accordingly, contains a minor portion of the silica, is then subjected to separation in a high intensity field, the resulting non-magnetic fraction is a phosphate concentrate containing relatively small proportions of silica, iron and aluminum impurities.

In the instant novel process, phosphatic ore is comminuted to liberate phosphatic values and then slurried with water. The aqueous slurry of the comminuted ore is beneficiated by hydroclassification, screening, or the like, to recover a concentrate fraction. The concentrate fraction in aqueous slurry form is then vigorously agitated to disperse slime particles. The slurry is dewatered, the solids are dried, and then subjected to an electrostatic separation to reduce the silica content and to produce a phosphate concentrate having an iron and aluminum content generally in excess of about 4% by weight as ferric oxide and aluminum oxide. This concentrate is passed through a high intensity magnetic field to separate a major portion of the compounds of iron and aluminum, and to recover a phosphatic concentrate containing small proportions of silica, iron and aluminum. Electrostatic beneficiation of the phosphate ore followed by high intensity magnetic separation of the electrostatic concentrate results in a substantially improved recovery of phosphatic values as compared to a process wherein the treated ore is first subjected to high intensity magnetic separation, and the resulting non-magnetic fraction is then subjected to electrostatic separation.

Any phosphatic ore containing high proportions of iron and aluminum impurities can be beneficiated in accordance with the instant novel process. For example, phosphatic ores containing compounds of iron and aluminum, determined as the oxides, in excess of about 3.5% by weight, and containing in excess of about 50% BPL by weight are suitable. Typical examples of suitable phosphatic ores include Tennessee white phosphate rock, as found in Perry, Decatur, and Johnson counties in Tennessee; Tennessee brown phosphate rock, as found in Maury and Williamson counties in Tennessee; and African phosphate rock, as found in the Senegal district of French West Africa. The mined ore is first comminuted in a suitable apparatus such as a hammer mill, jaw crusher, and the like to liberate phosphatic values contained in the ore. The particle size at which liberation of phosphatic values occurs will vary with the particular ore being treated, but the desired liberation is generally accomplished by comminution of the ore to pass a screen having a mesh size between about 6 mesh and about 48 mesh. Either the "as-mined" ore, or the ore in aqueous slurry form, can be comminuted to effect liberation of the phosphatic values. Sufficient water is then added to the comminuted ore to form a slurry of between about 50 and about 70% solids by weight, and the resulting slurry is agitated vigorously to disperse agglomerated particles of the ore.

The slurry is then subjected to a size separation step, such as hydroclassification and/or screening, whereby solids are separated into a coarse fraction, an intermediate fraction, and a fine fraction. Generally, solids with the highest proportion of phosphate values are in the intermediate fraction. Therefore, coarse and fine fractions are separated from the desired intermediate fraction before subsequent treatment in order to obtain optimum recovery of phosphate values in the product. The maximum particle size of the intermediate fraction is between about 8 and about 48 mesh and preferably between about 12 and about 20 mesh. The minimum particle size of the intermediate fraction is between about 100 mesh and about 35 microns, and preferably between about 150 mesh and about 325 mesh.

Solid particles comprising the desired intermediate fraction are slurried at least once with sufficient water to form a slurry having a solids concentration between about 50% and about 70% solids by weight. The slurry is then agitated vigorously to disperse any slimes, i.e., solids having a maximum particle size between about 100 mesh and about 35 microns, adhering to the coarse solids. In a preferred embodiment of the invention, sodium hexametaphosphate is added to the slurry before agitation in proportions between about 1 and about 5 pounds of sodium hexametaphosphate per ton of solids in the slurry. The slurry is agitated vigorously for at least 5 minutes to disperse slime particles in the aqueous phase, and then deslimed by dewatering. The deslimed solids are washed with water, dewatered, and heated to dryness.

The comminuted, deslimed solids are prepared for electrostatic beneficiation by heating and charging of the particles, in accordance with the procedures set forth in U.S. Patent No. 2,805,769, issued September 10, 1957, to James E. Lawver. In order to obtain satisfactory charging and acceptable separation, it is essential that the solids be thoroughly dry and maintained at a temperature of at least 150° F. during the charging and up to the point of introduction as freely falling bodies into the electrostatic field. In general, temperatures of between about 200° F. and about 500° F. produce the most desirable results, but higher temperatures which do not deleteriously affect the solids can be employed.

Charging of the solids is attained through the medium of contact electrification. Suitable methods of charging the solids are disclosed in the aforesaid U.S. Patent No. 2,805,769, and include imparting of charges to the particles by means of frictional contact thereof with a source of free electrons such as a donor plate or by particle-to-particle contact between the particles of different components of the feed material. Particle-to-particle charging can be effected by tumbling the particles while at a temperature of at least 150° F. down an elongated inclined chute in such quantity that contact between the particles and the chute is at a minimum, or by delivering the solids, while maintained at the proper temperature, to one or more electrostatic fields by means of a vibrating chute.

Each electrostatic field is created by impressing a direct current voltage between one or more pairs of vertically mounted electrodes. Suitable electrodes for use in the instant novel process are described in U.S. Patent No. 2,706,044, issued April 12, 1955, to Charles C. Cook, Jr. The strength of the electrostatic field between the electrodes which will effectively alter the path of particles will vary with the average particle size of the ore fed to the separator and the magnitude of charge on the particle. The strength can be varied from about 3,000 volts per inch of distance between electrodes in separating material of relatively fine particle size, to about 15,000 volts per inch of distance between electrodes for separating coarser particles. In general, it is preferred to operate with a total impressed potential difference between electrodes in the range of between about 30,000 and about 250,000 volts, and preferably between about 60,000 and about 150,000 volts.

A plurality of collection hoppers are positioned beneath each pair of electrodes or each bank of electrodes, as the case may be, to collect two or more fractions produced in the electrostatic separation. It is preferred to collect three fractions designated as the concentrate, intermediate and tailing fractions, respectively. The concentrate fraction may be passed through one or more electrostatic fields in the same manner as the original feed. The intermediate fraction is recycled to the inclined chute of the initial or a subsequent electrostatic separation step. The tailing fraction may be discarded or subjected to a scavenger electrostatic separation.

The concentrate recovered from the electrostatic separation step, which contains a major portion of the phosphate values and an excessive amount of iron and aluminum impurities, is then passed through a high intensity magnetic field whereby the concentrate is separated into a magnetic fraction and a non-magnetic fraction. A high intensity magnetic separator, such as an induction roll type, having a flux density of at least about 25,000 maxwells per square inch, and preferably between about 27,000 and about 100,000 maxwells per square inch, is used to effect the separation. The magnetic fraction, which is attracted to and retained by the magnetic separator, contains a major portion of iron and aluminum impurities originally present in the feed to the magnetic separator. The non-attracted or non-magnetic fraction which is discharged from the magnetic separator is substantially enriched with respect to phosphate content and contains only a minor portion of the iron and aluminum impurities originally present in the feed to the magnetic separator. Preferably the non-magnetic fraction is passed through the high intensity magnetic field one or more times. If more than one passage through the magnetic field is made, the intensity of the magnetic field may be held constant for all passes, or the separation may be made with progressively higher or lower intensity fields on each pass. In addition, the separation may be made under conditions in which the intensity of the magnetic field is varied from pass to pass. The nature of the ore will determine the method of operation that will give an optimum separation.

The non-magnetic fraction produced by the instant novel process has a BPL content in excess of 72% by weight, and a combined weight of iron and aluminum, determined as $Fe_2O_3$ and $Al_2O_3$ of less than 4% by weight.

In another embodiment of the invention, a phosphatic ore, such as Senegal phosphate ore, is comminuted to effect substantial liberation of phosphatic values, and the ore is slurried with water. The slurry is subjected to strong agitation to disperse aggregates of the ore and then screened to separate coarse pebble from the aqueous slurry of fine solids. The size of the screen used in this separation is between about 8 and about 20 mesh, and preferably between about 12 and about 16 mesh. Fine solids retained in the aqueous slurry passing through the screen are treated as described more fully hereinafter. Coarse pebble separated in the screening step is heated to dryness and comminuted to pass a screen having a size between about 12 and about 20 mesh. Comminuted solids are then subjected to a high intensity magnetic separation in a suitable magnetic separator having a field intensity in excess of about 25,000 maxwells per square inch. The non-magnetic fraction or component is suitable for use as a direct-application fertilizer. The magnetic fraction which contains a high proportion of the iron and aluminum impurities, is discarded.

Fine solids from the screening step, in aqueous slurry form, are passed through a hydroseparator or other suitable classifying apparatus to effect a further separation of solids at a size between about 100 and about 325 mesh. Coarse solids from the latter separation step are slurried with sufficient water to form a slurry of between about 50% and about 70% solids, and sufficient sodium hexametaphosphate is added to provide between about 1 and about 5 pounds of sodium hexametaphosphate per ton of solids in the feed. The resulting slurry is vigorously agitated to disperse slimes adhering to the surface of the coarse solids. The slurry is then deslimed and dewatered, and the moist coarse solids are then treated as described more fully below.

Solids having a maximum particle size of between about 100 and about 325 mesh recovered in aqueous slurry form from the aforesaid size separation step are passed through one or more cyclone separators, whereby a size separation is made at about 35 microns. Overflow from the cyclone separation step, containing particles smaller than about 35 microns, is discarded. Underflow from the cyclone separation step containing solids larger than 35 microns is dewatered and then admixed with the aforesaid dewatered moist coarse solids from the size separation step. The mixture of moist solids is heated to dryness at a temperature of between about 300 and about 700° F., and then subjected to an electrostatic separation as described above. The phosphate rock concentrate containing excessive proportions of iron and aluminum impurities produced thereby is then subjected to separation in a high intensity magnetic field as described above to produce a non-magnetic fraction containing in excess of 72% BPL by weight and less than 4% by weight of iron and aluminum determined as the oxides.

The following examples are presented to further define the invention without any intent to be limited thereby. All percentages are by weight unless otherwise specified. The term "Insol." as used in the examples refers to materials insoluble in boiling aqueous hydrochloric acid solution (1:1 HCl).

*Example I*

Phosphate ore from the vicinity of Mount Pleasant, Maury County, Tennessee, was comminuted to liberate phosphate values, then slurried with water, hydroclassified and screened to produce a −16 +325 mesh solids fraction. Chemical analyses of these solids were as follows:

| Constituent: | Proportion, percent |
|---|---|
| BPL | 70.1 |
| Insol. | 10.4 |
| $Fe_2O_3$ | 2.8 |
| $Al_2O_3$ | 2.3 |

Solids comprising the −16 +325 mesh fraction were slurried with water (at about 70% solids concentration), vigorously agitated for about 30 minutes to disperse slime particles, and then screened on a 325 mesh screen. Solids retained by the screen were heated to a temperature of about 300° F., the solids were delivered to an inclined vibrating chute, and discharged therefrom as freely falling bodies into an electrostatic field maintained between two vertically mounted electrodes. The electrodes were similar in design to the electrodes described in the aforesaid U.S. Patent No. 2,706,044. Each electrode consisted of a series of curved tubes mounted side by side with free space between one tube and an adjacent tube. Each tube had a diameter of 4 inches and a length of 10 feet. The space or field between the electrodes was about 10 inches at the top and about 55 inches at the bottom. A direct current voltage impressed upon te electrodes provided a potential difference of about 90,000 volts between the two vertically mounted electrodes. With respect to ground, a potential difference of +45,000 volts was impressed upon one electrode and a potential difference of −45,000 volts was impressed upon the other. Ten collection pans positioned beneath the electrodes caught the separated feed, the contents of each pan varying in grade of product from the pan next to it. Following is an analysis of the products of the electrostatic separation:

| Component | Proportion | | |
|---|---|---|---|
| | Weight, percent | BPL, percent | Insol., percent |
| Composite, Pans 1 and 2 | 7.3 | 48.6 | 36.1 |
| Composite, Pans 3, 4, and 5 | 31.9 | 71.6 | 9.3 |
| Pan 6 | 22.6 | 75.8 | 4.1 |
| Composite, Pans 7, 8, 9, and 10 | 29.8 | 76.0 | 3.7 |
| −325 mesh slimes | 8.4 | 46.6 | 28.0 |

Solids in pans 6, 7, 8, 9 and 10 were combined and passed through the high intensity magnetic field of a high intensity induction roll magnetic separator, Carpco standard laboratory model M−12. The length of the magnet was 1.5 inches. Solids were fed to the magnetic separator at a rate equivalent to between about 0.32 and about 0.43 tons per hour per foot of magnet length per pass. The first pass was carried out at about 0.5 ampere, which was equivalent to a field intensity of about 27,000 maxwells per square inch. The magnetic fraction retained by the separator was collected. The non-magnetic fraction discharged from the separator was passed through the separator a second time. The second pass was carried out at about 1.8 amperes, which was equivalent to a field intensity of about 90,000 maxwells per square inch. The magnetic fraction from the second pass was combined with the magnetic fraction from the first pass and the composite of solids in pans 1, 2, 3, 4 and 5 of the electrostatic step. Chemical analyses of the components produced in the beneficiation steps are as follows:

| Component | Proportion | | | |
|---|---|---|---|---|
| | BPL, percent | Insol., percent | $Fe_2O_3$ percent | $Al_2O_3$ percent |
| Non-magnetic fraction | 76.9 | 4.2 | 1.8 | 1.6 |
| Pans 1 to 5 and magnetic fractions | 67.3 | 13.7 | 3.5 | 2.3 |

The non-magnetic fraction was a superior grade of phosphate rock concentrate suitable for use in the preparation of triple superphosphate, phosphoric acid, and the like.

*Example II*

Phosphate ore from the Senegal district of French West Africa was comminuted to pass a 6 mesh screen and then vigorously agitated for about 10 minutes with sufficient water to form a slurry of about 57% solids. The slurry was then hydroclassified to recover solids having a maxmum particle size of about 14 mesh and a minimum particle size of about 325 mesh. The −14 +325 mesh solids were admixed with sufficient water to form a slurry of about 70% solids. Sodium hexametaphosphate (3 pounds per ton of solids) was added to the slurry and the resulting mixture was then agitated vigorously for about 5 minutes. The slurry was screened at 325 mesh to separate water and slime particles from the coarse solids. Moist solids retained by the screen were heated at a temperature of about 300° F. for about two hours. While at a temperature of about 300° F., the solids were subjected to an electrostatic separation using the procedure and apparatus of Example I.

Chemical analyses of the various components of the −14 +325 mesh fraction were as follows:

| Component | Proportion | | | | |
|---|---|---|---|---|---|
| | Weight, percent | BPL, percent | Insol., percent | $Fe_2O_3$, percent | $Al_2O_3$, percent |
| Composite, pans 1 and 2 | 19.3 | 3.82 | 92.02 | | |
| Composite pans 3, 4 and 5 | 5.7 | 38.39 | 50.0 | | |
| Composite pans 6 and 7 | 21.7 | 75.37 | 8.19 | 2.08 | 2.14 |
| Composite pans 8, 9 and 10 | 49.2 | 82.71 | 2.11 | | |
| −325 mesh slimes | 4.1 | 65.7 | 13.2 | | |

Solids recovered in pans 6 to 10 were combined and subjected to a high intensity magnetic separation, using the procedure and equipment of Example I. Chemical analyses of the resulting magnetic and non-magnetic fractions were as follows:

| Fraction | Proportion | | | | |
|---|---|---|---|---|---|
| | Weight, percent | BPL, percent | Insol., percent | $Fe_2O_3$, percent | $Al_2O_3$, percent |
| Magnetic | 10.7 | 52.5 | 11.92 | 18.13 | 11.55 |
| Non-magnetic | 89.3 | 81.7 | 3.02 | 1.05 | 1.99 |

The non-magnetic fraction produced in this example was a superior grade of phosphate rock concentrate suitable for use in the preparation of phosphoric acid, triple superphosphate and the like.

Having thus fully described and illustrated the invention, what is desired to be secured by Letters Patent is:

1. A method of beneficiating phosphatic ores containing silica and large proportions of iron and aluminum impurities which comprises the steps of comminuting the phosphatic ore to liberate phosphatic values, desliming the ore, drying the deslimed ore, subjecting the dried ore while at a temperature of at least about 150° F. to differential charging and to an electrostatic separation to separate out a major portion of the silica, recovering a phosphatic concentrate containing iron and aluminum impurities and a minor portion of the silica, subjecting said concentrate to separation in a high intensity magnetic field, whereby a magnetic fraction containing a major portion of the compounds of iron and aluminum is separated from the non-magnetic fraction, and recovering said non-magnetic fraction rich in phosphate values and low in compounds of iron and aluminum.

2. The method of claim 1 wherein the intensity of said magnetic field is in excess of about 25,000 maxwells per square inch.

3. The method of claim 1 wherein the potential difference between electrodes in said electrosatic field is between bout 3,000 and about 15,000 volts per inch.

4. The method of claim 1 wherein said non-magnetic fraction is passed through a high intensity magnetic field of increased magnetic intensity over that of the first magnetic separation, and recovering from the second magnetic separation a non-magnetic fraction rich in phosphate values and low in compounds of iron and aluminum.

5. A method of beneficiating phosphatic ores containing silica and large proportions of iron and aluminum impurities which comprises the steps of comminuting the phosphatic ore to liberate phosphatic values, slurrying the comminuted ore with water, separating solids in said slurry into a coarse fraction, an intermediate fraction and a fine fraction, dewatering and drying said intermediate fraction, passing the resulting dry solids, while at a temperature above about 150° F., down an inclined chute, whereby differential charging of the dry solids is effected, delivering said solids from said chute as freely falling bodies into an electrostatic field maintained between two vertically mounted electrodes to separate out a major portion of the silica, recovering a phosphate concentrate containing iron and aluminum impurities and a minor portion of the silica, passing said concentrate through a high intensity magnetic field, whereby a magnetic fraction containing a major portion of the compounds of iron and aluminum is separated from the non-magnetic fraction, and recovering said non-magnetic fraction rich in phosphate values and low in compounds of iron and aluminum.

6. A method of beneficiating phosphatic ores containing silica and large proportions of iron and aluminum impurities which comprises the steps of comminuting the phosphatic ore to liberate phosphatic values contained therein, slurrying the comminuted ore with water, separating solids in said slurry into a coarse fraction, an intermediate fraction and a fine fraction, said intermediate fraction having a maximum particle size between about 8 and about 48 mesh and a minimum particle size between about 100 mesh and about 35 microns, slurrying solids comprising the intermediate fraction with water, vigorously agitating the resulting slurry to disperse slime particles, desliming and dewatering said agitated slurry, drying the resulting moist solids at a temperature between about 200 and about 500° F., passing the dried solids, while at a temperature above about 200° F., down an inclined chute, whereby differential charging of the dry solids is effected, delivering said solids from said chute as freely falling bodies into an electrostatic field maintained between two vertically mounted electrodes to separate out a major portion of the silica, the potential difference between said electrodes being between about 3,000 and about 15,000 volts per inch, recovering a phosphate concentrate containing iron and aluminum impurities and a minor portion of the silica, passing said concentrate through a high intensity magnetic field having a field intensity of between about 25,000 and about 100,000 maxwells per square inch, whereby a magnetic fraction containing a major portion of the compounds of iron and aluminum is separated from the non-magnetic fraction, and recovering said non-magnetic fraction rich in phosphate values and low in compounds of iron and aluminum.

7. A method of beneficiating Senegal phosphate ore containing silica and high proportions of iron and aluminum impurities which comprises the steps of comminuting the ore to liberate phosphatic values contained therein, slurrying the comminuted ore with water, separating solids in said slurry into a coarse fraction, an intermediate fraction, and a fine fraction, said intermediate fraction having a maximum particle size between about 8 and about 48 mesh and a minimum particle size between about 100 and about 325 mesh, slurrying solids comprising the intermediate fraction with water, vigorously agitating the resulting slurry to disperse slime particles, desliming and dewatering said agitated slurry, recovering the moist deslimed intermediate fraction produced thereby, slurrying with water the solids comprising said fine fraction, further sizing said fine fraction in said slurry at about 35 microns, recovering solids larger than about 35 microns and admixing them with said deslimed intermediate fraction, drying the resulting mixture at a temperature between about 200° F. and about 500° F., passing the dried solids, while at a temperature above about 200° F., down an inclined chute, whereby differential charging of the dry solids is effected, delivering said solids from said chute as freely falling bodies into an electrostatic field maintained between two vertically mounted electrodes to separate out a major portion of the silica, the potential difference between said electrodes being between about 3,000 and about 15,000 volts per inch, recovering a phosphate concentrate containing iron and aluminum impurities and a minor portion of the silica, passing said concentrate through a high intensity magnetic field having a field intensity of between about 25,000 and about 100,000 maxwells per square inch, whereby a magnetic fraction containing a major portion of the compounds of iron and aluminum is separated from the non-magnetic fraction, and recovering said non-magnetic fraction rich in phosphate values and low in compounds of iron and aluminum.

References Cited in the file of this patent

UNITED STATES PATENTS

| 2,094,440 | Weis | Sept. 28, 1937 |
| 2,352,324 | Hubler | June 27, 1944 |
| 2,424,552 | Clemmer | July 29, 1947 |
| 2,586,545 | Le Baron | Feb. 19, 1952 |
| 2,765,074 | Diamond | Oct. 2, 1956 |
| 2,805,769 | Lawver | Sept. 10, 1957 |